(12) United States Patent
Noguchi et al.

(10) Patent No.: US 7,338,730 B2
(45) Date of Patent: Mar. 4, 2008

(54) CONDUCTIVE CURABLE RESIN COMPOSITION AND SEPARATOR FOR FUEL CELL

(75) Inventors: Masayuki Noguchi, Kawasaki (JP); Tomoaki Kobayashi, Kawasaki (JP); Tadashi Iino, Kawasaki (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 11/058,283

(22) Filed: Feb. 16, 2005

(65) Prior Publication Data

US 2005/0171270 A1   Aug. 4, 2005

Related U.S. Application Data

(62) Division of application No. 10/363,922, filed as application No. PCT/JP02/08033 on Aug. 6, 2002.

(60) Provisional application No. 60/316,983, filed on Sep. 5, 2001.

(30) Foreign Application Priority Data

Aug. 6, 2001   (JP)   ............................ 2001-237949

(51) Int. Cl.
  *H01M 2/02*   (2006.01)
(52) U.S. Cl. ..................... 429/34; 524/114; 524/404; 524/495; 524/496
(58) Field of Classification Search ................. 429/34; 524/114, 404, 495, 496
  See application file for complete search history.

(56) References Cited

U.S. PATENT DOCUMENTS

| | | | |
|---|---|---|---|
| 4,812,525 A | 3/1989 | Oshima et al. | |
| 6,290,767 B1 | 9/2001 | Bergemann et al. | |
| 6,403,697 B1 | 6/2002 | Mitsunaga et al. | |
| 6,627,689 B2 * | 9/2003 | Iino et al. | 524/404 |

FOREIGN PATENT DOCUMENTS

| | | |
|---|---|---|
| EP | 0 935 303 A | 8/1999 |
| EP | 1 029 893 A2 | 8/2000 |
| EP | 1 085 046 A | 3/2001 |
| JP | 57-42157 B2 | 9/1982 |
| JP | 58-53167 A | 3/1983 |
| JP | 60-37670 A | 2/1985 |
| JP | 60-161144 A | 8/1985 |
| JP | 60-246568 A | 12/1985 |
| JP | 64-340 B2 | 1/1989 |
| JP | 1-311570 A | 12/1989 |
| JP | 6-22136 B2 | 3/1994 |
| JP | 8-222241 A | 8/1996 |
| JP | 11-12555 A | 1/1999 |
| JP | 2000-017179 A1 | 1/2000 |
| JP | 2000-234055 | 8/2000 |
| JP | 2000-239488 | 9/2000 |
| JP | 2000-281933 A | 10/2000 |
| JP | 2001-68128 A | 3/2001 |
| JP | 2002-164063 A | 6/2002 |

OTHER PUBLICATIONS

Sau K P et al., "Conductive Rubber Composites From Different Blends of Ethylene-Propylene-Diene Rubber and Nitrile Rubber." *Journal of Materials Science*, Chapman and Hall Ltd. London, GB, vol. 32, No. 21, Nov. 1, 1997, pp. 5717-5724, XP0000704817.
DATABASE WPI. Section EI, Week 200210. Derwent Publications Ltd., London, GB, Class X16, AN 2002-070701, XP002219951.
International Search Report for PCT/JP02/08033 dated Nov. 20, 2002.
Japanese Office Action dated Jan. 16, 2007.

\* cited by examiner

*Primary Examiner*—Peter D. Mulcahy
(74) *Attorney, Agent, or Firm*—Sughrue Mion, PLLC

(57) ABSTRACT

There is provided a conductive curable resin composition comprising (A) a curable resin composition comprising an elastomer with a Mooney viscosity ($ML_{1+4}$ (100° C.)) of 25 or greater at 2-80 wt % and (B) a carbon material, with a weight ratio of component (A) to component (B) of 70-5:30-95. The curable resin composition of component (A) preferably comprises (A1) an elastomer at 80-2 wt %, (A2) a radical reactive resin at 20-98 wt % and (A3) an organic peroxide at 0.2-10 parts by weight to 100 parts by weight of (A1+A2). Also provided are a process for production of a conductive cured resin by shaping and curing of the conductive curable resin composition, and a fuel cell separator, an assembly for a cell, an electrode or a heat releasing plate, obtained thereby.

17 Claims, 2 Drawing Sheets

CONDUCTIVE CURABLE RESIN COMPOSITION AND SEPARATOR FOR FUEL CELL

CROSS-REFERENCE TO RELATED APPLICATION

This is a divisional of application Ser. No. 10/363,922 filed on Mar. 10, 2003, which is the national stage of PCT/JP02/08033 filed Aug. 6, 2002, and claims benefit pursuant to 35 U.S.C. §119(e)(1) of the filing date of the Provisional Application 60/316,983 filed Sep. 5, 2001, pursuant to 35 U.S.C. §111(b); the disclosures are incorporated herein by reference in their entirety.

TECHNICAL FIELD

The present invention relates to a conductive curable resin composition with excellent conductivity and heat release properties, and particularly it relates to a fuel cell separator, an assembly for a cell, an electrode or a heat releasing plate and to a process for their production.

BACKGROUND ART

Metals and carbon materials have conventionally been used for purposes requiring high conductivity. Carbon materials, in particular, being materials free of the corrosion that is characteristic of metals and exhibiting excellent heat resistance, lubricating properties, thermoconductivity and durability, have come to play an important role in fields such as electronics, electrochemistry, energy, transport vehicles and the like. Composite materials made of combinations of carbon materials and polymer materials have also reached dramatic levels of development, and have come to serve in a capacity of ever increasing performance and functionality. Greater freedom in shaping processability permitted by combinations with polymer materials in particular has been one reason for the increased development of carbon materials in fields requiring conductivity.

In recent years, in light of problems related to the environment and energy, greater attention has been focused on clean electric generators wherein fuel cells generate electricity by the reverse reaction of water electrolysis, using hydrogen and oxygen, and producing no waste other than water, and carbon and polymer materials also play an important role for these as well. Solid polymer fuel cells appear to be most promising for use in automobiles and people's use when the purpose is operation at low temperatures. Such fuel cells can exhibit high-output electricity generation by lamination of simple cells composed of a polymer solid electrolyte, gas diffusing electrodes, a catalyst and a separator.

The separators used to partition the simple cells usually have grooves for supply of fuel gas and oxidizing gas, and must have high gas impermeability to achieve complete separation of the gases, as well as high conductivity to reduce internal resistance. Other requirements include thermal conductivity, durability and strength.

In order to satisfy these requirements, such separators have traditionally been examined from the standpoint of both metals and carbon materials. The corrosion problem associated with metals has invited attempts to coat the surfaces with precious metals or carbon, but it has not been possible to achieve adequate durability, and the costs of coating have also been a problem.

On the other hand, carbon materials have also been extensively studied, examples of which include molded articles obtained by press molding expanded graphite sheets, molded articles obtained by impregnating a sintered carbon material with a resin and curing, and molded articles obtained by mixing and molding thermosetting resin-fired glassy carbon, carbon powder and a resin.

For example, in Japanese Unexamined Patent Publication (Kokai) HEI No. 8-222241 there is disclosed a complex process in which a bonding material is added to carbonaceous powder to ensure reliability and dimensional precision and the mixture is heated and formed by CIP, after which this is fired and graphitized to produce an isotropic graphite material which is then impregnated with a thermosetting resin, subjected to curing treatment, and carved with grooves by a cutting step. Also, Japanese Unexamined Patent Publication SHO No. 60-161144 discloses impregnating a thermosetting resin into paper comprising carbon powder or carbon fiber, and then laminating the paper, pressing the laminate and firing it. Japanese Unexamined Patent Publication No. 2001-68128 discloses injection molding of a phenol resin into a separator-shaped die and firing it. Such fired materials exhibit high electroconductivity, but the long time required for firing lowers the productivity. When a cutting step is necessary, the productivity is further lowered and costs are increased, such that numerous problems have prevented their future use as common materials.

On the other hand, molding methods have been considered as means of increasing productivity and lowering costs, and the materials used therefor have generally been composites of carbon-based fillers and resins. For example, Japanese Unexamined Patent Publication SHO No. 58-53167, Japanese Unexamined Patent Publication SHO No. 60-37670, Japanese Unexamined Patent Publication SHO No. 60-246568, Japanese Examined Patent Publication (Kokoku) SHO No. 64-340 and Japanese Examined Patent Publication HEI No. 6-22136 each disclose a separator made of a thermosetting resin such as a phenol resin, graphite or carbon, Japanese Examined Patent Publication SHO No. 57-42157 discloses a bipolar separator made of a thermosetting resin such as an epoxy resin and an electroconductive material such as graphite, and Japanese Unexamined Patent Publication HEI No. 1-311570 discloses a separator comprising a mixture of expanded graphite and carbon black with a thermosetting resin such as a phenol resin or furan resin.

Separators employing composites of a carbon-based filler and a resin require a drastically greater content of the carbon-based filler to exhibit high conductivity, but because a large amount of resin must be added to maintain moldability, it has been difficult to achieve sufficiently high conductivity. It has also been attempted to shape the composition into a highly precise sheet by rolling or the like and harden it into a fuel cell separator shape, for the purpose of improving thickness precision which is a particularly important characteristic for fuel cell separators, but since the resulting sheet is not uniform when it contains a high content of carbon-based filler, it has been necessary to increase the amount of resin serving as the matrix. As a result, it has not been possible to achieve adequate electrical conductivity and thermal conductivity.

When, for higher electrical conductivity, a firing step is included wherein the molded article is heated for a long period at a high temperature of 1000-3000° C., the length of time required for production is extended and the production process becomes complicated, thereby further increasing the cost.

It is an object of the present invention, which has been accomplished in light of these circumstances, to provide a conductive curable resin composition with loadability of a high content of conductive filler and with excellent shaping processability. It is another object thereof to provide a fuel cell separator an assembly for a cell, an electrode or a heat releasing plate with excellent conductivity and heat release properties, which is obtained by shaping the above-mentioned composition into a sheet while it is still uncured, and curing it into a fuel cell separator shape an assembly for a cell, an electrode or a heat releasing plate, as well as a process for their production.

DISCLOSURE OF THE INVENTION

In light of these circumstances, the present inventors engaged in diligent efforts to develop a conductive curable resin composition composed mainly of a carbon-based filler and a curable resin composition, wherein the cured product would exhibit excellent conductivity and superior heat release properties and, by adding a high molecular weight elastomer to a curable resin composition, we have succeeded in developing a conductive curable resin composition which allows a high packing content of a carbon-based filler, exhibits excellent shaping processability and can be shaped into a uniform sheet while still in an uncured state, as well as an uncured sheet prepared from the composition. We have completed the invention as a highly conductive fuel cell separator, an assembly for a cell, an electrode or a heat releasing plate with excellent thin-film thickness precision, and a process for its production, by combining a specific boron-containing carbon material with the aforementioned curable resin composition.

In other words, the invention designed to achieve the aforestated object relates to a conductive curable resin composition according to [1] to [20] below, an uncured sheet prepared therefrom, a fuel cell separator, an assembly for a cell, an electrode or a heat releasing plate employing it and a process for their production.

[1] A conductive curable resin composition characterized by comprising (A) a curable resin composition comprising an elastomer with a Mooney viscosity ($ML_{1+4}$ (100° C.)) of 25 or greater at 2-80 wt % and (B) a carbon material, with a weight ratio of component (A) to component (B) of 70-5:30-95.

[2] The conductive curable resin composition according to [1], characterized in that the curable resin composition of component (A) comprises (A1) an elastomer with a Mooney viscosity ($ML_{1+4}$ (100° C.)) of 25 or greater at 80-2 wt %, (A2) a radical reactive resin at 20-98 wt %, the total of the components (A1) and (A2) being 100 wt %, and (A3) an organic peroxide at 0.2-10 parts by weight to 100 parts by weight of (A1+A2).

[3] The conductive curable resin composition according to [2], characterized in that the elastomer of component (A1) is one or a combination of two or more selected from the group consisting of acrylonitrile-butadiene rubber, hydrogenated nitrile rubber, styrene-butadiene rubber, ethylene-propylene rubber, ethylene-propylene-diene terpolymer rubber, ethylene-butadiene rubber, fluorine-containing rubber, isoprene rubber, silicone-rubber, acryl rubber and butadiene rubber.

[4] The conductive curable resin composition according to [3], wherein the elastomer of component (A1) is one or a combination of two or more selected from the group consisting of acrylonitrile-butadiene rubber, hydrogenated nitrile rubber, styrene-butadiene rubber, ethylene-propylene rubber, ethylene-propylene-diene terpolymer rubber and butadiene rubber.

[5] The conductive curable resin composition according to any one of [1] to [4], characterized in that the carbon material of component (B) is one or a combination of two or more selected from the group consisting of graphite powder, artificial graphite powder, natural graphite powder, expanded graphite powder, carbon fiber, vapor-grown carbon fiber with a diameter of 0.05-10 μm and a length of 1-500 μm, carbon nanotubes with a fiber diameter of 0.5-100 nm and a fiber length of 0.01-10 μm, and carbon black.

[6] The conductive curable resin composition according to [5], wherein the graphite powder is graphite powder with a mean particle size of 0.1-150 μm and a lattice spacing (Co value) of 6.745 Å or smaller.

[7] The conductive curable resin composition according to any one of [1] to [6], characterized in that when the carbon material of component (B) is pressurized to a bulk density of 1.5 g/cm$^3$, the powder electric resistivity in the direction perpendicular to the direction of pressurization is no greater than 0.07 Ωcm.

[8] The conductive curable resin composition according to any one of [1] to [7], characterized in that the carbon material of component (B) contains boron at 0.05-10 wt %.

[9] The conductive curable resin composition according to any one of [1] to [8], which is used for sheet molding.

[10] A process for producing an uncured sheet, characterized in that the conductive curable resin composition according to any one of [1] to [9] is shaped while in an uncured state, using one type of shaping machine such as an extruder, roller and calender.

[11] An uncured sheet produced by the process according to [10].

[12] An uncured sheet according to [10] which has a thickness of 0.5-3 mm and a width of 20-3000 mm.

[13] A process for producing a grooved cured sheet, characterized in that the uncured sheet according to [11] or [12] is cut or punched, and the sheet is supplied to a die and heat cured with a compression molding machine.

[14] A fuel cell separator produced by the method described in [13] using a single-side or double-side grooved die.

[15] A fuel cell separator obtained by curing an uncured sheet according to [11] or [12].

[16] A fuel cell separator comprising a cured sheet obtained by supplying the conductive curable resin composition according to any one of [1] to [9] or the uncured sheet according to [11] or [12] into a double-side grooved die and curing it with a compression molding machine, the fuel cell separator being characterized by having a volume resistivity of no greater than $2\times10^{-2}$ Ωcm, a contact resistance of no greater than $2\times10^{-2}$ Ωcm$^2$, a thermal conductivity of at least 1.0 W/m·K and a permeability of $1\times10^{-6}$ cm$^2$/sec, and by containing at least 0.1 ppm of boron.

[17] A fuel cell separator, an assembly for a cell, an electrode or a heat releasing plate characterized by being a grooved conductive cured resin sheet comprising (A) a curable resin composition comprising an elastomer at 2-80 wt % based on the weight of the curable resin composition and (B) a carbon material, with a weight ratio of component (A) to component (B) of 70-5:30-95.

[18] The fuel cell separator, an assembly for a cell, an electrode or a heat releasing plate according to [17], characterized in that the elastomer of component (A) is one or a combination of two or more selected from the group consisting of acrylonitrile-butadiene rubber, hydrogenated nitrile rubber, styrene-butadiene rubber, ethylene-propylene rubber, ethylene-propylene-diene terpolymer rubber, ethylene-butadiene rubber, fluorine-containing rubber, isoprene rubber, silicone-rubber, acryl rubber and butadiene rubber.

[19] The fuel cell separator, an assembly for a cell, an electrode or a heat releasing plate according to [17] or [18], wherein component (A) comprises the elastomer at 80-2 wt % and a radical reactive resin at 20-98 wt %.

[20] The fuel cell separator according to any one of [17] to [19], characterized by having a volume resistivity of no greater than $2\times10^{-2}$ Ωcm, a contact resistance of no greater than $2\times10^{-2}$ Ωcm$^2$, a thermal conductivity of at least 1.0 W/m·K and a permeability of no greater than $1\times10^{-6}$ cm$^2$/sec, and by containing at least 0.1 ppm of boron.

BEST MODE FOR CARRYING OUT THE INVENTION

Figure 1:
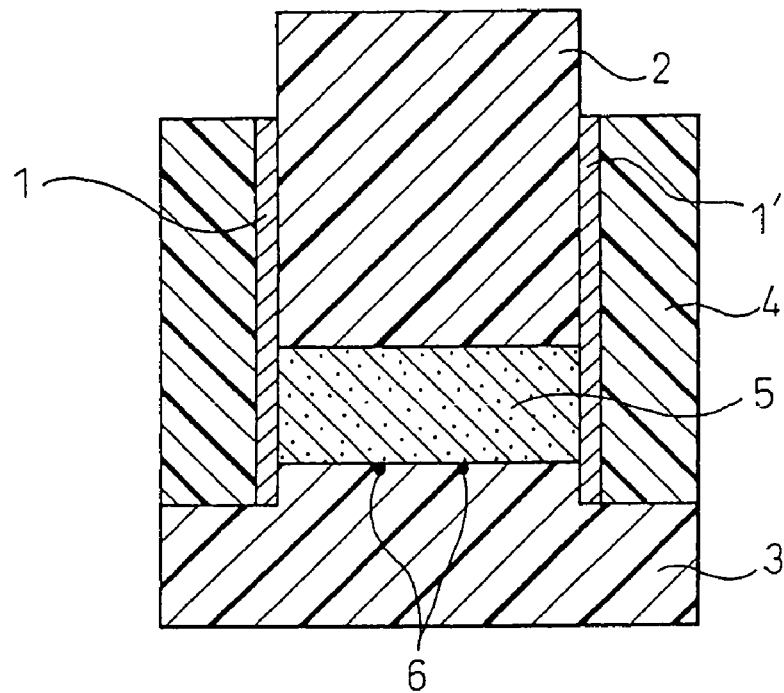
FIG. 1 is an illustration showing a method of measuring the electric resistivity of graphite powder.

The present invention will now be explained in greater detail.

The elastomer (A1) in the curable resin composition of component (A) according to the invention is one or a combination of two or more selected from among acrylonitrile-butadiene rubber, hydrogenated nitrile rubber, styrene-butadiene rubber, ethylene-propylene rubber, ethylene-propylene-diene terpolymer rubber, ethylene-butadiene rubber, fluorine-containing rubber, isoprene rubber, silicone-rubber, acryl rubber, butadiene rubber, high styrene rubber, chloroprene rubber, urethane rubber, polyether-based special rubber, tetrafluoroethylene-propylene rubber, epichlorohydrin rubber, norbornane rubber and butyl rubber.

Of these, acrylonitrile-butadiene rubber, hydrogenated nitrile rubber, styrene-butadiene rubber, ethylene-propylene rubber, ethylene-propylene-diene terpolymer rubber, ethylene-butadiene rubber, butadiene rubber, fluorine-containing rubber, high styrene rubber, polyether-based special rubber and epichlorohydrin rubber are preferred from the standpoint of durability, water resistance and workability, with acrylonitrile-butadiene rubber, hydrogenated nitrile rubber, styrene-butadiene rubber, ethylene-propylene rubber, ethylene-propylene-diene terpolymer rubber and butadiene rubber being especially preferred.

The elastomer (A1) in the curable resin composition of component (A) according to the invention has a Mooney viscosity (ML$_{1+4}$ (100° C.)) of 25 or greater, preferably 40 or greater and more preferably 50 or greater. If the Mooney viscosity (ML$_{1+4}$ (100° C.)) is less than 25, the loadability of the carbon material filler is poor, thus hampering continuous shaping of a uniform uncured sheet when the carbon material filler is packed to a high content. The Mooney viscosity may be measured according to JIS K6300, using a Mooney viscosity measuring device AM-1 (product of Toyo Seiki Seisakusho, Ltd.). M in ML$_{1+4}$ (100° C.) is the Mooney viscosity, L indicates an L rotor type, $_{1+4}$ indicates 1 minute of preheating and 4 minutes of rotor operation, and (100° C.) indicates a testing temperature of 100° C.

The radical reactive resin (A2) in the curable resin composition of component (A) according to the invention is a resin containing a vinyl group or allyl group at the ends of the molecule or containing a carbon-carbon unsaturated double bond or primary carbon alkyl chain on the main chain or a resin composition containing the resin. As examples there may be mentioned compositions of one or more selected from among unsaturated polyester resins, vinyl ester resins, allyl ester resins, urethane acrylate resins, alkyd resins, diallyl phthalate resins and 1,2-polybutadiene resins.

In fields that require heat resistance, acid resistance and the like, a resin having in the molecular skeleton a ring structure such as a homocyclic or heterocyclic ring is preferred. For example, resins such as bisphenol-containing unsaturated polyester or vinyl ester resins, novolac-type vinyl ester resins, allyl ester resins, and diallyl phthalate resins are preferred since they can improve the heat resistance, chemical resistance and hot water resistance.

1,2-polybutadiene resins are preferable from the viewpoint of heat resistance, chemical resistance, and heat water resistance since they do not contain double bonds in the main chains.

According to the invention, the component used as the curable resin composition of component (A) may also contain, in addition to the aforementioned components (A1) and (A2), also a radical reactive monomer containing an unsaturated double bond such as a vinyl or allyl group, for the purpose of reaction rate control, viscosity adjustment, crosslinking density improvement, addition of greater function, and the like. As examples there may be mentioned unsaturated fatty acid esters, aromatic vinyl compounds, vinyl esters of saturated fatty acids or aromatic carboxyl acids and their derivatives and crosslinkable polyfunctional monomers.

Unsaturated fatty acid esters include alkyl (meth)acrylates such as methyl(meth)acrylate, ethyl (meth)acrylate, butyl (meth)acrylate, 2-ethylhexyl (meth)acrylate, octyl(meth) acrylate, dodecyl (meth)acrylate, octadecyl(meth)acrylate, cyclohexyl (meth)acrylate and methylcyclohexyl(meth) acrylate; acrylic acid aromatic esters such as phenyl (meth) acrylate, benzyl(meth)acrylate, 1-naphthyl (meth)acrylate, fluorophenyl(meth)acrylate, chlorophenyl (meth)acrylate, cyanophenyl(meth)acrylate, methoxyphenyl (meth)acrylate and biphenyl(meth)acrylate; haloalkyl (meth)acrylates such as fluoromethyl(meth)acrylate and chloromethyl(meth)acrylate; glycidyl(meth)acrylates, alkylamino(meth)acrylates and α-cyano acrylic acid esters.

As the aromatic vinyl compounds there may be mentioned styrene, α-methylstyrene, chlorostyrene, styrenesulfonic acid, 4-hydroxystyrene and vinyltoluene.

The saturated fatty acid or aromatic carboxyl acid vinyl esters and their derivatives include vinyl acetate, vinyl propionate and vinyl benzoate.

As the crosslinkable polyfunctional monomers there may be mentioned di(meth)acrylates such as ethyleneglycol di(meth)acrylate, diethyleneglycol di(meth)acrylate, triethyleneglycol di(meth)acrylate, tetraethyleneglycol di(meth) acrylate, tripropyleneglycol di(meth)acrylate, 1,3-butyleneglycol di(meth)acrylate, 1,4-butanediol di(meth)acrylate, 1,5-pentadiol di(meth)acrylate, 1,6-hexadiol di(meth)acrylate, neopentylglycol di(meth)acrylate, oligo ester di(meth) acrylates, polybutadiene di(meth)acrylate, 2,2-bis(4-(meth) acryloyloxyphenyl)propane and 2,2-bis(4-ω-(meth) acryloyloxypyriethoxy)phenyl)propane; aromatic diallyl carboxylates such as diallyl phthalate, diallyl isophthalate, dimethallyl isophthalate, diallyl terephthalate, diallyl 2,6-naphthalenedicarboxylate, diallyl 1,5-naphthalenedicarboxylate, diallyl 1,4-xylenedicarboxylate and diallyl 4,4'-diphenyldicarboxylate; difunctional crosslinkable monomers such as diallyl cyclohexanedicarboxylate and divinylbenzene; trifunctional crosslinkable monomers such as trimethylolethane tri(meth)acrylate, trimethylolpropane tri(meth)acrylate, pentaerythritol tri(meth)acrylate, tri(meth) allyl isocyanurate, tri(meth)allyl cyanurate, triallyl trimellitate and diallyl chlorendate; and tetrafunctional crosslinkable monomers such as pentaerythritol tetra(meth)acrylate.

Addition of crosslinkable polyfunctional monomers is preferred for improved heat resistance and hot water resistance.

The organic peroxide (A3) used in the curable resin composition of component (A) according to the invention may be any publicly known one such as a dialkyl peroxide, acyl peroxide, hydroperoxide, ketone peroxide, peroxy ester or the like. Specifically there may be mentioned benzoyl peroxide, 1-cyclohexyl-1-methylethylperoxy-2-ethylhexanate, 1,1,3,3-tetramethylbutylperoxy-2-ethylhexanate, 1,1-bis(t-butylperoxy)-3,3,5-trimethylcyclohexane, 1,1-bis(t-butylperoxy)cyclohexane, 2,2-bis(4,4-dibutylperoxycyclohexyl)propane, t-hexylperoxy-2-ethylhexanate, t-butylperoxy-2-ethyl hexanate, 2,5-dimethyl-2,5-di(t-butylperoxy)hexane, 2,5-dimethyl-2,5-di(benzoylperoxy)hexane, t-butylperoxy benzoate, t-butylcumyl peroxide, p-menthane hydroperoxide, t-butyl hydroperoxide, cumene hydroperoxide, dicumyl peroxide, di-t-butylperoxide, 2,5-dimethyl-2,5-dibutylperoxyhexyne-3 and the like.

Those among the above-mentioned which have a decomposition temperature from 90° C. to 190° C. and an activation energy of 30 Kcal/mol or higher are preferred from the standpoint of the product shaping cycle as well as strength and durability. Preferred examples include 1,1-bis(t-butylperoxy)cyclohexane, 1,1-bis(t-butylperoxy)-3,3,5-trimethylcyclohexane, 2,5-dimethyl-2,5-di(t-butylperoxy)hexane, 2,5-dimethyl-2,5-di(benzoylperoxy)hexane, t-butylperoxybenzoate, t-butylcumyl peroxide, p-menthane hydroperoxide, t-butyl hydroperoxide, cumene hydroperoxide, dicumyl peroxide, di-t-butyl peroxide and 2,5-dimethyl-2,5-dibutylperoxyhexyne-3.

The weight ratios of the elastomer (A1) and the radical reactive resin (A2) of the curable resin composition are 80-2 wt % of the elastomer and 20-98 wt % of the radical reactive resin (A1+A2=100 wt %). The conductivity of the cured product is reduced if the elastomer amount exceeds 80 wt %, while the sheet moldability is poor if it is less than 2 wt %. More preferably, the elastomer proportion is 70-5 wt % and the radical reactive resin proportion is 30-95 wt %. Further preferably, the elastomer proportion is 60-10 wt % and the radical reactive resin proportion is 40-90 wt %.

The organic peroxide (A3) in the curable resin composition is added at 0.2-10 parts by weight to 100 parts by weight of the (elastomer (A1)+radical reactive resin (A2)). It is added at more preferably 0.5-8 parts by weight and even more preferably 0.8-6 parts by weight. If the amount of the organic peroxide (A3) exceeds 10 parts by weight, decomposition of the organic peroxide leads to increased generation of gas, often causing reduced airtightness of the product. At less than 0.2 part by weight, the crosslinking density of the product is lowered, thus reducing the strength and often also impairing the durability.

Preferably, the carbon material of component (B) according to the invention is one or a combination of two or more selected from the group consisting of graphite powder, artificial graphite powder, natural graphite powder, expanded graphite powder, carbon fiber, vapor-grown carbon fiber with a fiber diameter of 0.05-10 μm and a fiber length of 1-500 μm, carbon nanotubes with a fiber diameter of 0.5-100 nm and a fiber length of 0.01-10 μm, and carbon black.

The graphite powder is preferably graphite fine powder with a mean particle size of 0.1-150 μm, more preferably 5-80 μm and a lattice spacing (Co value) of 6.745 Å or smaller. The graphite powder preferably contains boron.

Boron-containing graphite fine powder with a mean particle size of 5-80 μm and a lattice spacing (Co value) of 6.745 Å or smaller may be obtained by adding a boron compound during graphitization in order to increase the conductivity and loadability-to-resin of the graphite powder.

When no boron is added, the degree of graphitization (crystallization) is lower and the interstitial space (hereinafter referred to as "Co value") increases, making it impossible to obtain graphite powder with adequately high conductivity.

The method of adding the boron is not restricted so long as the boron and/or boron compound is mixed in the graphite, but preferably the boron is present between the graphite crystal layers, or else a portion of the carbon atoms of the graphite crystals are replaced with boron atoms. The bonds between the boron atoms and carbon atoms, when a portion of the carbon atoms are replaced with boron atoms, may be any type of bonds such as covalent bonds or ionic bonds.

In order to obtain graphite powder, usually produce coke first. The starting material for coke may be petroleum-based pitch, coal-based pitch or the like. Such starting materials are carbonized to produce coke.

Graphitized powder is generally obtained from coke by a method of pulverizing the coke prior to graphitization treatment, a method of graphitizing the coke itself prior to pulverization, or a method of adding a binder to the coke and molding and firing it into a fired product (where the coke and the fired product are both referred to as coke) which is then graphitized and pulverized into powder. According to the invention, the method of pulverizing the coke prior to graphitization is preferably employed. Since the starting material coke should preferably have as low a degree of crystallization as possible, the starting material coke subjected to heat treatment at no higher than 2000° C. and preferably no higher than 1200° C. is preferable.

It was discovered that graphitization of coke powder not only promotes crystallization but also reduces the surface area of the particles, and is therefore convenient also from that standpoint.

For example, coke powder with a mean particle size of 10 μm obtained by pulverization of coke has a specific surface area of about 14 m$^2$/g, but upon graphitization at 2800° C. or higher, the specific surface area reduces to 2-3 m$^2$/g. Yet, when pulverization is carried out after graphitization, this value is at least 5 m$^2$/g and in some cases 10 m$^2$/g or higher, depending on the particle size. In contrast, in the method of graphitization after pulverization, the carbon atoms presumably rearrange and a portion of the surface volatilizes at the high temperature during the graphitization, thereby cleaning or smoothing the surface and lowering the specific surface area.

For pulverization of the coke there may be employed a high speed rotary pulverizer (hammer mill, pin mill or cage mill) or any of various types of ball mills (tumbling mill, oscillating mill or planetary mill), agitating mills (bead mill, attritor, channel mill or annular mill), or the like. There may also be used fine pulverizing machine, such as screen mill, turbo mill, super micron mill, jet mill, with appropriate selection of the conditions. The pulverizer is used to pulverize the coke, with appropriate selection of the pulverization conditions, and with classification of the powder if necessary, to a mean particle size in the range of preferably 0.1-150 μm. More preferably, the particles with a size of less than 0.1 μm and/or greater than 150 μm are essentially removed, leaving less than 5 wt % or less and preferably 1 wt % or less of such particles.

Preferably, the graphite powder of the invention preferably contains boron and the granularity of the graphite powder, in terms of the mean particle size, is preferably 0.1-150 μm, more preferably 1-100 μm, further preferably 5-80 μm. The particle size was measured by the laser diffraction scattering method. Specifically, a 50 mg sample was weight out, 50 ml of distilled water was added, 0.2 ml of a 2% aqueous Triton (surfactant) solution was further added, the mixture was subjected to ultrasonic diffusion for 3 minutes and then measurement was taken with a Microtrack HRA apparatus by Nikkiso Corp.

The method of classifying the coke powder may be any one which allows separation, and for example, it may employ screening with shieres or an air classifier such as a forced vortex centrifugal classifier (micron separator, turboplex, turboclassifier or super separator) or an inertial classifier (improved virtual impactor or elbow jet). A wet precipitating separation method or centrifugal classifying method may also be used.

Graphite powder according to the invention may also be obtained by adding elemental B or $H_3BO_3$, $B_2O_3$, $B_4C$, BN or the like as the boron source to powder such as coke prior to graphitizing treatment, and thoroughly mixing for graphitization. With non-uniform mixture of the boron compound with the carbon material, not only does the graphite powder become non-uniform, but the possibility of sintering of graphite powder during graphitization is also increased. For a uniform mixture, the boron source is preferably mixed with the powder such as coke, after preparation as a powder with a particle size of no greater than 50 μm and preferably no greater than about 20 μm.

A higher graphitization temperature is preferred for the powder such as the boron source-containing coke powder, but due to restrictions on the apparatus, etc., it is preferably in the range of 2500-3200° C. The graphitizing method used may be a method employing an Atchison furnace, wherein the powder is placed in a graphite crock and subjected to direct electrification, or a method whereby the powder is heated with a graphite heating unit.

The graphite powder of the invention is preferably one with high crystallinity, while the Co value of the graphite structure comprising stacked hexagonal reticular layers is preferably no greater than 6.745 Å, more preferably no greater than 6.730 Å and even more preferably no greater than 6.720 Å. Increasing the crystallinity of the graphite powder allows the electrical resistance of the cured product to be lowered.

Expanded graphite powder may be obtained, for example, by immersing graphite which has achieved a highly crystalline structure, such as natural graphite or pyrolytic graphite, in a strongly oxidizing solution such as a mixed solution of concentrated sulfuric acid and nitric acid or a mixture of concentrated sulfuric acid and hydrogen peroxide water to produce a graphite interlaminar compound, washing with water, and rapidly heating for expansion in the C-axis direction of the graphite crystals, and this powder may also be rolled into a sheet form and then pulverized.

The carbon fiber may be a pitch-based fiber made from heavy crude oil, oil by-product, coal tar or the like, or a PAN-based fiber made from polyacrylonitrile.

The vapor-grown carbon fiber is obtained, for example, by using an organic compound such as benzene, toluene or natural gas as the starting material for thermal decomposition reaction with hydrogen gas at a temperature of 800-1300° C. in the presence of a transition metal catalyst such as ferrocene. It is then preferably subjected to graphitizing treatment at about 2500-3200° C. More preferably, it is subjected to graphitizing treatment at about 2500-3200° C. with a graphitizing catalyst such as boron, boron carbide, beryllium, aluminum or silicon.

According to the invention, the vapor-grown carbon fiber used preferably has a fiber diameter of 0.05-10 μm and a fiber length of 1-500 μm, more preferably it has a fiber diameter of 0.1-5 μm and a fiber length of 5-50 μm, and even more preferably it has a fiber diameter of 0.1-0.5 μm and a fiber length of 10-20 μm.

Carbon nanotubes have been a focus of the industry in recent years not only for their mechanical strength but also for their electric field-emitting function and hydrogen occlusion properties, and they have also begun to receive attention for their magnetic function. Such carbon nanotubes are known as graphite whiskers, filamentous carbon, graphite fibers, ultrafine carbon tubes, carbon tubes, carbon fibrils, carbon microtubes and carbon nanofibers. Carbon nanotubes include monolayer carbon nanotubes comprising only one graphite film forming the tubes, and multilayer carbon nanotubes comprising multi graphite films forming the tubes. Either of these types may be used according to the invention, but monolayer carbon nanotubes are preferred since they can be used to obtain cured products with higher conductivity and mechanical strength.

Carbon nanotubes may be manufactured, for example, by the arc discharge method, laser vapor deposition method or thermal decomposition method as described in "Carbon Nanotube Basics", Corona Publications (pp. 23-57, 1998), and may be purified by hydrothermal method, centrifugal separation, ultrafiltration or oxidation in order to increase the purity. More preferred is high temperature heating in an inert gas atmosphere at about 2500-3200° C. to remove the impurities. Even more preferred is high temperature heating in an inert gas atmosphere at about 2500-3200° C. together with a graphitizing catalyst such as boron, boron carbide, beryllium, aluminum, silicon or the like.

According to the invention, the carbon nanotubes used preferably have a fiber diameter of 0.5-100 nm and a fiber length of 0.01-10 μm, more preferably a fiber diameter of 1-10 nm and a fiber length of 0.05-5 μm, and even more preferably a fiber diameter of 1-5 nm and a fiber length of 0.1-3 μm.

The fiber size and fiber length of the vapor-grown carbon fibers and carbon nanotubes according to the invention may be measured with an electron microscope.

As the carbon black there may be mentioned ketchen black or acetylene black obtained by incomplete combustion of natural gas or the like or thermal decomposition of acetylene, furnace carbon obtained by incomplete combustion of hydrocarbon oils or natural gas, and thermal carbon obtained by thermal decomposition of natural gas.

The carbon material of component (B) according to the invention, when at a bulk density of 1.5 $g/cm^3$, preferably has a low powder electric resistivity in the direction perpendicular to the direction of pressurization, and it is preferably no greater than 0.07 Ωcm and more preferably no greater than 0.01 Ωcm. An electric resistivity of the carbon material of greater than 0.07 Ωcm results in lower conductivity of the cured product obtained by curing the composition also comprising the curable resin, making it impossible to obtain the desired cured product.

Figure 2:
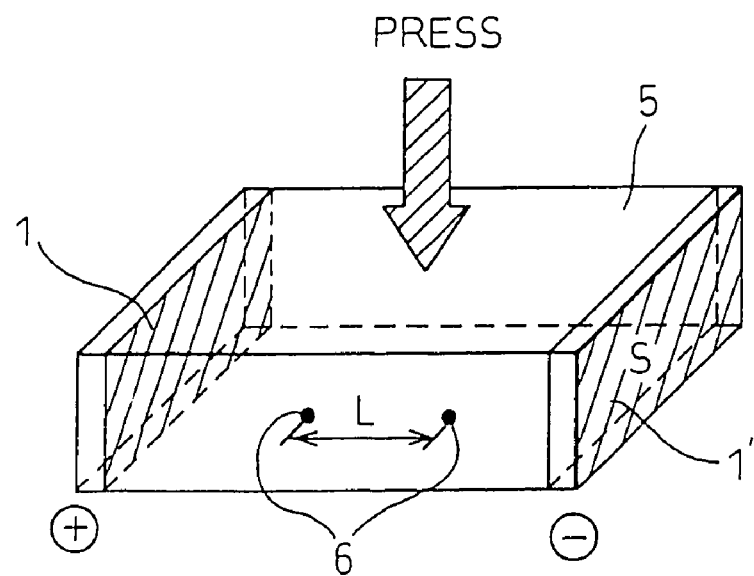
FIG. 2 is an illustration showing a method of calculating the electric resistivity of graphite powder.

A method of measuring the electric resistivity of graphite powder is illustrated in FIG. 1 and FIG. 2. In FIGS. 1, 1 and 1' are, respectively, (+) and (−) electrodes made of copper plates, 2 is a compression rod made of resin while 3 is a pedestal and 4 is a side frame, both made of resin, 5 is a graphite powder sample, and 6 is a set of voltage-measuring terminals set under the sample and at the center of the sample in the direction perpendicular to the drawing page surface.

The electric resistivity of the sample is measured in the following manner, using the 4-terminal method illustrated in FIG. 1 and FIG. 2. The sample is compressed with the compression rod 2. A current (I) is caused to flow to the (−) electrode 1' from the (+) electrode 1. The voltage (V) between the terminals 6 is measured. Here, the voltage is the value measured when the sample is pressed by the compression rod to a bulk density of 1.5 g/cm$^3$. If the electric resistance of the sample (between the terminals) is R(Ω), then R=V/I. From this it is possible to determine the electric resistivity by ρ=R·S/L (ρ: electric resistivity, S=cross-sectional area (cm$^2$) in the direction of electrification of the sample, i.e. the direction perpendicular to the direction of compression, and L is the distance between the terminals 6 (cm)). For actual measurement, the sample has a perpendicular cross-section with a width of about 1 cm, a length (height) of 0.5-1 cm and an electrification directional length of 4 cm, and the distance (L) between terminals is 1 cm.

The boron when contained in the carbon material of component (B) according to the invention is preferably present at 0.05-10 wt % in the carbon material. If the boron content is less than 0.05 wt %, it may not be possible to obtain graphite powder with the intended high conductivity. A boron content of greater than 10 wt % is not preferred because no further effect of improved conductivity of the carbon material can be expected.

As the method of adding the boron, a boron-containing graphite fine powder of the invention may be used alone, or it may be added by blending with another carbon material. Alternatively, elemental B, or $B_4C$, BN, $B_2O_3$, $H_3BO_3$ or the like may be added as the boron source to artificial graphite, natural graphite, carbon fiber, vapor-grown carbon fiber (VGCF), carbon nanotubes (CNT) or the like, either alone or in admixture, and the mixture thoroughly blended and subjected to graphitizing treatment at about 2500-3200° C.

The curable resin composition (A) and carbon material (B) of the invention are present in a weight ratio of 70-5:30-95. If the amount of component (A) added exceeds 70 wt % and the amount of the carbon material (B) is less than 30 wt %, the conductivity of the cured product is reduced. The ratio of component (A) and component (B) is more preferably 45-5:55-95, further preferably 20-10:80-90.

The conductive curable resin composition of the invention may also contain additives such as glass fibers, inorganic fiber fillers, organic fibers, ultraviolet stabilizers, antioxidants, defoaming agents, leveling agents, release agents, lubricants, water-repellants, thickeners, low shrinking agents, hydrophilic enhancers, crosslinking aids, etc. for the purpose of improving the hardness, strength, conductivity, shapability, durability, weather resistance, water resistance and the like.

In order to obtain a conductive curable resin composition according to the invention, the aforementioned components are mixed to maximum uniformity using a mixing or kneading machine commonly used in the field of resins, such as a roller, extruder, kneader, Banbury mixer, Henschel mixer, planetary mixer or the like, while maintaining a temperature at which the mixture does not begin to harden. When an organic peroxide is to be added, all of the other components may first be uniformly mixed and the organic peroxide added last.

The obtained conductive curable resin composition is shaped once using an extruder, roller, calender or the like into a sheet of prescribed thickness and width at a temperature at which the composition does not begin to be cured, in order to obtain a fuel cell separator with high thickness precision. For example, when an extruder is used, the conductive curable resin composition in powder or lump form is loaded into a sheet molding die-equipped extruder kept at a temperature from 60-100° C. and subjected to extrusion molding, and then taken up by a conveyer or the like. For molding with even higher thickness precision, calendering is preferably accomplished with a roll or calender after molding in the extruder. The extrusion molding is preferably carried out in a vacuum in order to eliminate voids or air in the sheet. When a roll is used, the powdered or lumpy conductive curable resin composition is introduced between two rolls kept at a temperature of 20-100° C., rotating at equal speed, for formation into a sheet, and then taken up by a conveyor or the like. For molding with even higher thickness precision, calendering is preferably accomplished with a roll or calender after sheet formation.

The conductive cured resin product obtained from the conductive curable resin composition of the invention is not particularly restricted in its use, but was developed for the purpose of fabricating a fuel cell separator, an assembly for a cell, an electrode or a heat releasing plate and is therefore highly suitable as a fuel separator, an assembly for a cell, an electrode or a heat releasing plate.

For fabrication of a fuel cell separator, an assembly for a cell, an electrode or a heat releasing plate from a sheet obtained in the manner described above, the sheet is cut or punched to the desired size, and then either one sheet or two or more sheets are inserted into a single-side or double-side grooved mold, and heat cured with a compression molding machine, to obtain a fuel cell separator, an assembly for a cell, an electrode or a heat releasing plate. The cavity is preferably evacuated during the curing in order to obtain a defect-free product. After curing, any warping in the product is preferably leveled by cooling under compression of 3 MPa or greater between press plates kept at 10-50° C.

As the conditions for curing, it is important to find and select the optimum temperature for the type of composition. For example, the conditions may be appropriately determined in a temperature range of 120-200° C., for a period from 30-1200 seconds. When this curing is finished, a completely cured product may be obtained by aftercuring in a temperature range of 150-200° C. for a period from 10-600 minutes. Aftercuring can eliminate warping in the product if a pressure of 5 MPa or greater is applied.

The fuel cell separator, an assembly for a cell, an electrode or a heat releasing plate of the invention preferably has the following characteristics. Specifically, the volume resistivity is preferably no greater than $2\times10^{-2}$ Ωcm and more preferably no greater than $8\times10^{-3}$ Ωcm, with $5\times10^{-3}$ Ωcm or lower being particularly preferred for use as a fuel cell separator. The contact resistance is preferably no greater than $2\times10^{-2}$ Ωcm$^2$, more preferably no greater than $1\times10^{-2}$ Ωcm$^2$ and especially $7\times10^{-3}$ Ωcm$^2$.

The thermal conductivity is preferably at least 1.0 W/m·K, more preferably at least 4.0 W/m·K and especially at least 10

W/m·K. The gas permeability, which is an important characteristic for a fuel cell separator, is preferably no greater than $1 \times 10^{-6}$ cm$^2$/sec, more preferably no greater than $1 \times 10^{-8}$ cm$^2$/sec and especially no greater than $1 \times 10^{-9}$ cm$^2$/sec.

Figure 3:
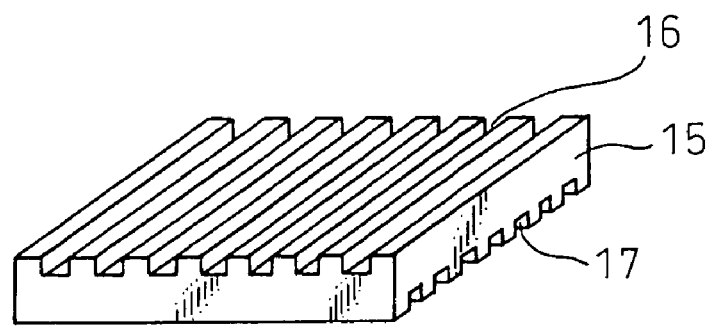
FIG. 3 shows a double-side grooved cured sheet.

FIG. 3 shows an embodiment of a double-side grooved cured sheet. The use of such double-side grooved cured sheets for construction of fuel cells is known and an explanation thereof is not considered necessary (see, for example, Japanese Unexamined Patent Publication SHO No. 58-53167).

The conductive curable resin composition of the invention allows shaping of a continuous sheet even with high packing of the carbon material, and it is therefore optimal for use as a composite material in fields requiring thickness precision, such as fuel cell separators, an assembly for a cell, an electrode or a heat releasing plate. The cured products obtained therefrom exhibit the electrical conductivity and heat conductivity of graphite without limits, and are highly functional from the standpoint of heat resistance, corrosion resistance and molding precision. Consequently, they are useful in the field of electronics and for such uses as electrical and mechanical devices or vehicles, and are particularly suitable as materials for fuel cell separators, an assembly for a cell, an electrode or a heat releasing plate.

EXAMPLES

The present invention will now be explained in greater detail by way of examples, with the understanding that they are in no way limitative on the invention.

The materials used were as follows. Component (A) (Curable resin composition).

A1: Elastomer

NBR1 (acrylonitrile-butadiene rubber; Nipol DN003 by Nihon Zeon, Mooney viscosity (ML$_{1+4}$ (100° C.): 78)

NBR2 (acrylonitrile-butadiene rubber; Nipol 1312 by Nihon Zeon, Mooney viscosity (ML$_{1+4}$ (100° C.): unmeasurable due to liquid form)

EPDM (ethylene-propylene-diene rubber; EP25 by Nihon Synthetic Rubber, Mooney viscosity (ML$_{1+4}$ (100° C.): 90)

SBR (styrene-butadiene rubber; SL574 by Nihon Synthetic Rubber, Mooney viscosity (ML$_{1+4}$ (100° C.): 64)

A2: Radical Reactive Resin

ALE (allyl ester resin; AA101 by Showa Denko K.K.)

VE1 (vinyl ester resin; sample containing 5 wt % phenol novolac-based diallyl phthalate, by Showa Highpolymer Co. Ltd; viscosity: 2.1 (Pa·sec, 80° C.))

VE2 (vinyl ester resin; H-600 by Showa Highpolymer Co. Ltd)

UP (unsaturated polyester resin; Upica 5836 by Nihon Upica)

A3: Organic Peroxide

DCP (dicumyl peroxide; Percumyl D by Nihon Oils and Fats)

Component (B) (Carbon Material)

B1: Boron-containing graphite fine powder was obtained by the following method.

LPC-S coke by Nippon Steel Chemical Co., Ltd., a (natural calcined) non-acicular coke (hereinafter referred to as "coke A") was crudely pulverized to a size of 2-3 mm with a pulverizer (product of Hosokawa Micron Co., Ltd.). The crude pulverized product was finely pulverized with a jet mill (IDS2UR, product of Nihon Pneumatic Co., Ltd.). It was then adjusted to the desired particle size by sieving. Particles of 5 μm and smaller were removed by air classification using a turboclassifier (TC15N, product of Nissin Engineering Co., Ltd.). After adding 0.6 kg of boron carbide (B$_4$C) to a 14.4 kg portion of the adjusted finely pulverized product, the mixture was blended for 5 minutes using a Henschel mixer at 800 rpm. The mixture was then placed in a cover-attached graphite crock with an inner diameter of 40 cm and a volume of 40 liters, and the crock was situated in a graphite heater-equipped graphitizing furnace and graphitized at a temperature of 2900° C. After being allowed to cool, the powder was taken out to obtain 14 kg of powder. The resulting graphite fine powder had a mean particle size of 20.5 μm, a lattice spacing (Co value) of 6.716 Å and a B content of 1.3 wt %.

B2: Boron-free graphite fine powder was obtained by the following method.

Coke A was crudely pulverized to a size of 2-3 mm with a pulverizer. The crude pulverized product was finely pulverized with a jet mill. It was then adjusted to the desired particle size by seiving. Particles of 5 μm and smaller were removed by air classification using a turboclassifier. The powder was then placed in a cover-attached graphite crock with an inner diameter of 40 cm and a volume of 40 liters, and the crock was situated in a graphite heater-equipped graphitizing furnace and graphitized at a temperature of 2900° C. After being allowed to cool, the powder was taken out to obtain graphite fine powder. The resulting graphite fine powder had a mean particle size of 20.5 μm, a lattice spacing (Co value) of 6.758 Å and a B content of 0 wt %.

UFG: Artificial graphite; UFG30 by Showa Denko K.K.

EXP: Expanded graphite; EXP-50EL by Nihon Graphite Industry

VGCF: Vapor-grown carbon fiber; VGCF-G (fiber diameter: 0.1-0.3 μm, fiber length: 10-50 μm) by Showa Denko K.K.

CNT: Carbon nanotubes were obtained by the following method.

In a graphite rod with a diameter of 6 mm and a length of 50 mm, a hole with a diameter of 3 mm and a depth of 30 mm was opened from the end along the center axis, and then a mixed powder of rhodium (Rh):platinum (Pt):graphite (C) in a weight ratio of 1:1:1 was packed therein, to fabricate an anode. A cathode made of 99.98% purity graphite was separately fabricated with a diameter of 13 mm and a length of 30 mm. The electrodes were placed opposite each other in a reactor and connected to a direct current power source. The interior of the reactor was substituted with 99.9% helium gas, and direct current arc discharge was performed. The soot (chamber soot) adhering to the inside of the reactor and the soot accumulated on the cathode (cathode soot) were collected. The pressure and current conditions in the reactor were 600 Torr and 70 A. During the reaction, the gap between the anode and cathode was constantly maintained at 1-2 mm.

The collected soot was placed in a 1:1 mixed solvent of water and ethanol and subjected to ultrasonic dispersion, and then the dispersion was recovered and the solvent was removed with a rotary evaporator. The sample was ultrasonically dispersed in a 0.1% aqueous solution of benzalkonium chloride as an anionic surfactant, and then centrifuged at 5000 rpm for 30 minutes, after which the dispersion was recovered. The dispersion was then heat treated for 5 hours in air at 350° C. for purification to obtain carbon nanotubes with a fiber diameter of 1-10 nm and a fiber length of 0.05-5 μm.

The properties of the cured product were measured by the following methods.

Volume Inherent Resistivity:

Measured by the 4-probe method according to JIS K7194.

Figure 4:
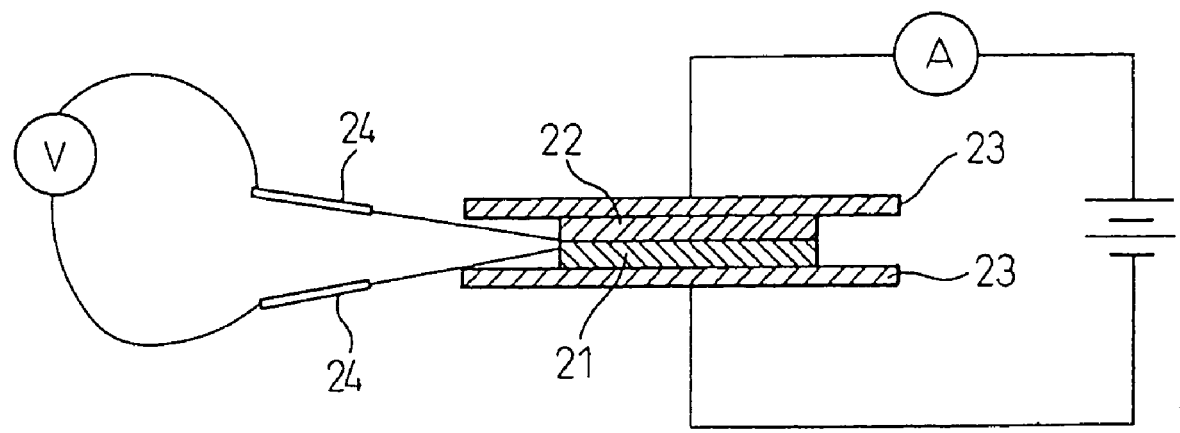
FIG. 4 is an illustration showing a method of measuring the contact resistance of a cured product.

Contact Resistance:

Using the apparatus shown in FIG. 4, a test piece 21 (20 mm×20 mm×2 mm) and a carbon panel 22 ($1.5\times10^{-3}$ Ωcm, 20 mm×20 mm×1 mm) were contacted and sandwiched between copper plates 23, and a load of 98 N was applied. A constant current of 1 A was passed through in the feedthrough direction, and then terminals 24 were contacted with the interface between the test piece 21 and the carbon panel 22 to measure the voltage, and the resistance value was calculated. This value was multiplied by the contacting cross-sectional area to obtain the contact resistance.

Flexural Strength, Flexural Modulus and Flexural Strain:

A test piece was measured by the 3-point flexural strength test method under conditions with a span gap of 64 mm and a bending rate of 2 mm/min, according to JIS K6911. The test piece size was 100×10×1.5 mm.

Thermal Conductivity:

A test piece (φ10 mm, thickness: 1.7 mm) was measured by the laser flash method ($t_{1/2}$ method using an LF/TCM FA8510B Laser Flash Thermal Constant Measuring Apparatus by Rigaku Denki), under conditions with a temperature of 80° C., vacuum, and ruby laser light (excitation voltage: 2.5 kV).

Gas Permeability:

Measured according to Method A of JIS K7126, using He gas at 23° C.

Sheet Shapability:

Using two 10-inch rolls under conditions with a roll temperature of 60° C., a roll gap width of 2 mm and a rotation speed of 15 rpm, the curable conductive resin composition was introduced for sheet shaping, and the shapability and appearance were evaluated.

Boron Content of Carbon Material:

Measured using an inductively coupled plasma mass spectrometer (ICP-MS) (SPQ9000, product of Seiko Instrument Inc.)

Surface Precision:

The surface of the cured sheet is uniformly divided into 16 sections, the thickness of the sheet at the center point of each section is measured, and the average of the thickness is calculated.

Examples 1-15 and Comparative Example 3

For Examples 1-15 and Comparative Example 3, a pressurizing kneader (volume: 1 L) was used for 1 minute to knead an elastomer component under conditions with a temperature of 70° C., and a rotation speed of 40 rpm. Next, a radical reactive resin and a carbon material were loaded and kneaded therewith for 5 minutes, after which DCP was loaded and kneaded therewith for 2 minutes. The total volume of the composition was adjusted to fill 80 vol % of the kneader volume. After kneading, the composition was shaped into a 2 mm-thick sheet using a 10-inch twin roll under conditions with a roll temperature of 60° C., a roll gap width of 2 mm and a high speed rotation of 15 rpm, the sheet was cut and inserted into a die capable of forming a 100×100×1.5 mm plate, and a 50 t compression molding machine was used for 5 minutes of curing with a die temperature of 170° C. and a pressure of 30 MPa to obtain a cured product.

Comparative Examples 1-2

For Comparative Examples 1-2, a pressurizing kneader (volume: 1 L) was used for 1 minute to knead a loaded elastomer component under conditions with a temperature of 70° C. and a rotation speed of 40 rpm. Next, a radical reactive resin and a carbon material were loaded and kneaded therewith for 5 minutes, after which DCP was loaded and kneaded therewith for 2 minutes. The total volume of the composition was adjusted to fill 80 vol % of the kneader volume. The kneaded product was inserted into a die capable of forming a 100×100×1.5 mm plate, and a 50 t compression molding machine was used for 5 minutes of curing with a die temperature of 170° C. and a pressure of 30 MPa to obtain a cured product.

Example 16

For Example 16, the composition used in Example 1 was formed into a 1.7 mm-thick uncured sheet using a 10-inch twin roll under conditions with a roll temperature of 60° C., a roll gap width of 1.7 mm and an equal rotation speed of 15 rpm, the uncured sheet was cut to a size of 280×200 mm and the cut sheets were inserted into a die capable of forming a plate with a size of 280×200×1.5 mm and having 1 mm-pitch grooves on both sides, and a 500 ton compression molding machine was used for 3 minutes of curing with a die temperature of 170° C. and a pressure of 60 MPa to obtain a double-side grooved cured body.

Example 17

For Example 17, the composition used in Example 1 was extrusion molded into a 1.8 mm-thick, 70 mm-wide sheet using a 60φ single-screw extruder under conditions with a temperature of 60-90° C. and a rotation speed of 40 rpm, the uncured sheet was cut into sheets having a size of 200×70 mm and the cut sheets were placed in parallel into a die capable of forming a plate with a size of 280×200×1.5 mm and having 1 mm-pitch grooves on both sides, and a 500-ton compression molding machine was used for 3 minutes of curing with a die temperature of 170° C. and a pressure of 60 MPa to obtain a double-side grooved cured body.

Comparative Example 4

For Comparative Example 4, the composition used in Example 1 was pulverized using a cooled Wiley mill (product of YOSHIDA SEISAKUSHO CO., LTD), cut sheets were arranged in parallel into a die capable of forming a plate with a size of 280×200×1.5 mm and having 1 mm-pitch grooves on both sides, and a 500-ton compression molding machine was used for 3 minutes of curing with a die temperature of 170° C. and a pressure of 60 MPa to obtain a double-side cured body.

Comparative Example 5

For Comparative Example 5, the composition used in Comparative Example 2 was pulverized using a cooled Wiley mill (product of YOSHIDA SEISAKUSHO CO., LTD), cut sheets were arranged in parallel into a die capable of forming a plate with a size of 280×200×1.5 mm and having 1 mm-pitch grooves on both sides, and a 500-ton compression molding machine was used for 3 minutes of curing with a die temperature of 170° C. and a pressure of 60 MPa to obtain a double-side grooved cured body.

Example 18

In Example 18, the properties of the double-side grooved cured sheet of Example 16 as a fuel cell separator were evaluated.

Example 19

In Example 19, the properties of the double-side groove cured body of Example 17 as a fuel cell separator were evaluated.

Comparative Example 6

In Comparative Example 6, the properties of the double-side grooved cured body of Comparative Example 4 as a fuel cell separator were evaluated.

Comparative Example 7

In Comparative Example 7, the properties of the double-side grooved cured body of Comparative Example 5 as a fuel cell separator were evaluated.

The results of Examples 18 and 19 and Comparative Examples 6 and 7 are shown in Table 4.

TABLE 1

| | | Example 1 | Example 2 | Example 3 | Example 4 | Example 5 | Example 6 | Comp. Ex. 1 | Comp. Ex. 2 | Comp. Ex. 3 |
|---|---|---|---|---|---|---|---|---|---|---|
| Elastomer | NBR1 | 20 | | | 10 | 20 | 80 | | | 90 |
| | NBR2 | | | | | | | 20 | | |
| | EPDM | | 15 | | 10 | | | | | |
| | SBR | | | 30 | | | | | | |
| Radical reactive resin | ALE | 80 | 85 | 70 | 80 | | | 80 | 100 | |
| | VE1 | | | | | 80 | 20 | | | 10 |
| Organic peroxide | DCP | 2 | 2 | 2 | 2 | 2 | 2 | 2 | 2 | 2 |
| Carbon material | B1 | 500 | 500 | 500 | 500 | 600 | 500 | 500 | 500 | 600 |
| Sheet shapability*[1] | | ○ | ○ | ○ | ○ | ○ | ○ | X | X | ○ |
| Volume resistivity | mΩ·cm | 5 | 4 | 8 | 5 | 4 | 15 | 5 | 3 | 33 |
| Contact resistance | mΩ·cm$^2$ | 6 | 5 | 7 | 6 | 5 | 18 | 6 | 8 | 35 |
| Thermal conductivity | W/mK | 15 | 17 | 14 | 15 | 15 | 12 | 17 | 15 | 8 |
| Flexural strength | MPa | 45 | 55 | 50 | 55 | 65 | 15 | 30 | 65 | 8 |
| Flexural modulus | GPa | 14 | 15 | 12 | 15 | 20 | 5 | 12 | 21 | 0.5 |
| Flexural strain | % | 0.5 | 0.5 | 0.7 | 0.6 | 0.5 | ≧3.5 | 0.4 | 0.3 | ≧3.5 |

*[1] ○: Successful continuous shaping of uniform sheet.
X: Unable to form a sheet; remained in powder form

TABLE 2

| | | Example 7 | Example 8 | Example 9 | Example 10 | Example 11 | Example 12 | Example 13 | Example 14 | Example 15 |
|---|---|---|---|---|---|---|---|---|---|---|
| Elastomer | NBR1 | 20 | 20 | 20 | 20 | 20 | 30 | 30 | 30 | 30 |
| Radical reactive resin | VE2 | 80 | 80 | 80 | 80 | 80 | | | | |
| | UP | | | | | | 70 | 70 | 70 | 70 |
| Organic peroxide | DCP | 2 | 2 | 2 | 2 | 2 | 2 | 2 | 2 | 2 |
| Carbon material | B1 | 500 | | 400 | 400 | | 350 | | 300 | |
| | B2 | | 500 | | | 400 | | 350 | | 300 |
| | UFG | | | | | | 100 | 100 | | |
| | EXP | | | | | | | | 100 | 100 |
| | VGCF | | | 50 | | | | | | |
| | CNT | | | | 50 | 50 | | | | |
| Boron content of carbon material (wt %) | | 1.3 | 0 | 1.14 | 1.12 | 0 | 0.89 | 0 | 0.97 | 0 |
| Volume resistivity | mΩ·cm | 4 | 15 | 3 | 2 | 10 | 6 | 20 | 5 | 33 |
| Contact resistance | mΩ·cm$^2$ | 6 | 20 | 4 | 3 | 16 | 8 | 40 | 6 | 35 |
| Thermal conductivity | W/mK | 15 | 16 | 12 | 11 | 11 | 18 | 19 | 8 | 8 |
| Flexural strength | MPa | 50 | 47 | 48 | 53 | 52 | 45 | 44 | 41 | 8 |

TABLE 2-continued

|  |  | Example 7 | Example 8 | Example 9 | Example 10 | Example 11 | Example 12 | Example 13 | Example 14 | Example 15 |
|---|---|---|---|---|---|---|---|---|---|---|
| Flexural modulus | GPa | 10 | 11 | 11 | 12 | 12 | 10 | 11 | 9 | 1 |
| Flexural Strain | % | 0.5 | 0.5 | 0.5 | 0.5 | 0.5 | 0.6 | 0.6 | 0.6 | 0.6 |

TABLE 3

|  |  | Sheet press shaping | | Powder press shaping | |
|---|---|---|---|---|---|
|  |  | Example 16 Roll | Example 17 Extrusion | Comp. Ex. 4 | Comp. Ex. 5 |
| Surface precision | mm | ±0.04 | ±0.04 | ±0.08 | ±0.12 |
| Gas permeability coefficient | cm²/sec | $10^{-10}$ | $10^{-9}$ | $10^{-6}$ | $10^{-5}$ |

TABLE 4

|  |  | Example 18 | Example 19 | Comp. Ex. 6 | Comp. Ex. 7 |
|---|---|---|---|---|---|
| Volume resistivity | mΩ·cm | 5 | 5 | 8 | 10 |
| Contact resistance | mΩ·cm² | 6 | 6 | 9 | 12 |
| Thermal conductivity | W/mK | 15 | 15 | 16 | 16 |

Table 1 shows that addition of an elastomer with a high Mooney viscosity allows satisfactory sheet shaping even with a high degree of packing of the carbon material. When no elastomer was present, addition of the carbon material at greater than 80 wt % resulted in a compound with a powdery state after kneading. Comparative Example 3 demonstrates that addition of a large amount of elastomer results in lower conductivity.

Table 2 shows that including boron in the carbon material gives cured products with high conductivity.

Table 3 shows that sheet press shaping gives fuel cell separator-shaped plates with a high surface precision (thickness precision) and satisfactory gas impermeability.

Table 4 shows that a double-side grooved cured body obtained by sheet pressing has satisfactory performances as a fuel cell separator.

According to the invention, addition of an elastomer with a high Mooney viscosity resulted in obtaining conductive curable resin compositions with excellent sheet, shapability and allowed a high degree of packing of the carbon materials. Using the boron-containing carbon materials as filler materials gave compositions exhibiting both high conductivity and high heat release properties, which when sheet formed using an extruder, roll, calender or the like and cured with by press shaping, yielded thin, large-area fuel cell separators with excellent gas impermeability and surface precision.

INDUSTRIAL APPLICABILITY

The conductive curable resin composition of the invention gives cured products with excellent conductivity and heat release properties which are widely suitable as materials that have not been achievable in the prior art, for example, in the field of electronics and for various purposes and parts such as electrical products, mechanical parts, vehicle parts and the like, and which are especially useful as materials for separators in fuel cells such as solid polymer fuel cells.

The invention claimed is:

1. A fuel cell separator, an assembly for a cell, an electrode or a heat releasing plate, produced by a process comprising shaping an uncured sheet using an extruder, roller or calendar, cutting or punching the uncured sheet, supplying the sheet to a single-side or double-side grooved die and heat curing with a compression molding machine, wherein the sheet comprises a conductive curable resin comprising (A) a curable resin composition comprising (A1) 2-80 wt % of an elastomer with a Mooney viscosity ($ML_{1+4}(100°$ C.)) of (A2) 25 or greater (A2) 98-20 wt % of a radical reactive resin, and (B) a carbon material, with a weight ratio of component (A) to component (B) of 70-5:30-95, and wherein said carbon material is selected from the group consisting of graphite powder, artificial graphite powder, natural graphite powder, expanded graphite powder, carbon fiber, vapor-grown carbon fiber with a fiber diameter of 0.05-10 μm and a length of 1-500 μm, carbon nanotubes with a diameter of 0.05-100 nm and a length of 0.01-10 μm, or a mixture thereof.

2. A fuel cell separator obtained by curing an uncured sheet produced by a process in which a conductive curable resin composition is shaped while in an uncured state using an extruder, roller or calendar, wherein the conductive resin composition comprises (A) a curable resin composition comprising (A1) 2-80 wt % an elastomer with a Mooney viscosity ($ML_{1+4}(100°$ C.)) of 25 or greater and (A2) 98-20 wt % of a radical reactive resin, and (B) a carbon material, with a weight ratio of component (A) to component (B) of 70-5:30-95, and wherein said carbon material is selected from the group consisting of graphite powder, artificial graphite powder, natural graphite powder, expanded graphite powder, carbon fiber, vapor-grown carbon fiber with a fiber diameter of 0.05-10 μm and a length of 1-500 μm, carbon nanotubes with a diameter of 0.05-100 nm and a length of 0.01-10 μm, or a mixture thereof.

3. A fuel cell separator comprising a cured body obtained by supplying a conductive curable resin composition comprising (A) a curable resin composition comprising (A1) 2-80 wt % of an elastomer with a Mooney viscosity ($ML_{1+4}$ (100° C.)) of 25 or greater and (A2) 90-20 wt % radical reactive resin, (B) a carbon material, with a weight ratio of component (A) to component (B) of 70-5:30-95 or an uncured sheet produced by a process of shaping the conductive curable resin composition while in an uncured state using an extruder, roller or calender into a double-side grooved die and curing it with a compression molding machine, wherein the fuel cell separator has a volume resistivity of no greater than $2\times10^{-2}$ Ωcm, a contact resistance of no greater than $2\times10^{-2}$ Ωcm², a thermal conductivity of at least 1.0 W/m·K and a gas permeability of no greater than $1\times10^{-6}$ cm²/sec, and contains at least 0.1 ppm of boron, and wherein said carbon material is selected from the group consisting of graphite powder, artificial graphite powder, natural graphite powder, expanded graphite powder, carbon fiber, vapor-grown carbon fiber with a fiber diameter of 0.05-10 μm and a length of 1-500 μm, carbon nanotubes with a diameter of 0.05-100 nm and a length of 0.01-10 μm, or a mixture thereof.

4. A fuel cell separator, an assembly for a cell, an electrode or a heat releasing plate comprising a grooved conductive cured resin sheet comprising (A) a curable resin composition comprising (A1) 2-80 wt % of an elastomer with a Mooney viscosity ($ML_{1+4}(100°\ C.)$) of 25 or greater and (A2) 98-20 wt % of a radical reactive resin, and (B) a carbon material, with a weight ratio of component (A) to component (B) of 70-5:30-95, and wherein said carbon material is selected from the group consisting of graphite powder, artificial graphite powder, natural graphite powder, expanded graphite powder, carbon fiber, vapor-grown carbon fiber with a fiber diameter of 0.05-10 μm and a length of 1-500 μm, carbon nanotubes with a diameter of 0.05-100 nm and a length of 0.01-10 μm, or a mixture thereof.

5. The fuel cell separator, an assembly for a cell, an electrode or a heat releasing plate according to claim 4, wherein the elastomer of component (A) is one or a combination of two or more selected from the group consisting of acrylonitrile-butadiene rubber, hydrogenated nitrile rubber, styrene-butadiene rubber, ethylene-propylene rubber, ethylene-propylene-diene terpolymer rubber, ethylene-butadiene rubber, fluorine-containing rubber, isoprene rubber, silicone-rubber, acryl rubber and butadiene rubber.

6. The fuel cell separator, an assembly for a cell, an electrode or a heat releasing plate according to claim 4, which is a fuel cell separator that has a volume resistivity of no greater than $2\times10^{-2}$ Ωcm, a contact resistance of no greater than $2\times10^{-2}$ Ωcm², a thermal conductivity of at least 1.0 W/m·K and a gas permeability of no greater than $1\times10^{-6}$ cm²/sec, and contains at 0.1 ppm of boron.

7. A fuel cell separator, an assembly for a cell, an electrode or heat releasing plate, comprising a cured resin sheet, wherein the sheet comprises (A) a curable resin composition comprising (A1) 2-80 wt % of an elastomer with a Mooney viscosity ($ML_{1+4}(100°\ C.)$) of 25 or greater and (A2) 98-20 wt % of a radical reactive resin and (B) a carbon material, with a weight ratio of component (A) to component (B) of 70-5:30-95, and wherein said carbon material is selected from the group consisting of graphite powder, artificial graphite powder, natural graphite powder, expanded graphite powder, carbon fiber, vapor-grown carbon fiber with a fiber diameter of 0.05-10 μm and a length of 1-500 μm, carbon nanotubes with a diameter of 0.05-100 nm and a length of 0.01-10 μm, or a mixture thereof.

8. The fuel cell separator according to any one of claims 1-4 and 7, wherein said Moony viscosity ($ML_{1+4}(100°\ C.)$) of the elastomer is 50 or greater.

9. The fuel cell separator according to claim 8, wherein said carbon material is selected from the group consisting of graphite powder, artificial graphite powder, natural graphite powder, expanded graphite powder, carbon fiber, vapor-grown carbon fiber with a fiber diameter of 0.05-10 μm and a length of 1-500 μm, carbon nanotubes with a diameter of 0.05-100 nm and a length of 0.01-10 μm, or a mixture thereof.

10. The fuel cell separator according to any one of claims 1-4 and 7, wherein said carbon material of component (B) contains boron at 0.05-10 wt %.

11. The fuel cell separator according to claim 8, wherein said carbon material of component (B) contains boron at 0.05-10 wt %.

12. The fuel cell separator according to claim 9, wherein said carbon material of component (B) contains boron at 0.05-10 wt %.

13. The fuel cell separator according to any one of claims 1-4 and 7, wherein said weight ratio of component (A) to component (B) is 45-5:55-95.

14. The fuel cell separator according to claim 8, wherein said weight ratio of component (A) to component (B) is 45-5:55-95.

15. The fuel cell separator according to claim 9, wherein said weight ratio of component (A) to component (B) is 45-5:55-95.

16. The fuel cell separator according to claim 11, wherein said weight ratio of component (A) to component (B) is 45-5:55-95.

17. The fuel cell separator according to claim 12, wherein said weight ratio of component (A) to component (B) is 45-5:55-95.

* * * * *